July 22, 1952     G. G. NAUD     2,604,075
FLUID PRESSURE SERVOMOTOR Filed April 17, 1946     6 Sheets-Sheet 1

INVENTOR.
George G. Naud
BY
James E. Sproll
ATTORNEY

Fig. 4

July 22, 1952 G. G. NAUD 2,604,075
FLUID PRESSURE SERVOMOTOR
Filed April 17, 1946 6 Sheets-Sheet 4

INVENTOR.
George G. Naud
BY
James E. Sproll
ATTORNEY

July 22, 1952 — G. G. NAUD — 2,604,075
FLUID PRESSURE SERVOMOTOR
Filed April 17, 1946 — 6 Sheets-Sheet 5

INVENTOR.
George G. Naud
BY James E. Sproll
ATTORNEY.

July 22, 1952

G. G. NAUD 2,604,075

FLUID PRESSURE SERVOMOTOR

Filed April 17, 1946

INVENTOR.
George G. Naud
BY
James E. Sproll
ATTORNEY.

Patented July 22, 1952

2,604,075

UNITED STATES PATENT OFFICE 2,604,075

FLUID PRESSURE SERVOMOTOR

George G. Naud, Seattle, Wash.

Application April 17, 1946, Serial No. 662,745

7 Claims. (Cl. 121—38)

This invention relates to pressure fluid servomotors and aims primarily to provide a novel pressure fluid servo-motor especially designed and particularly adapted for use and application in the shifting of single-acting and double-acting clutches; in the shifting of power transmission reverse gears; and in various other power appliances and mechanisms, wherein positional change of an element or member thereof is desired or required.

Another object of the invention is to provide a pressure fluid servo-motor adapted for both electrical and manual operation.

A further object is to provide a pressure fluid servo-motor adapted to be actuated from either a local or a remote station or stations, or both.

A still further object is to provide a pressure fluid servo-motor, wherein the force or drawbar pull exerted thereby and the speed of operation thereof are selectively adjusted and controlled to obtain the desired operating condition.

A still further object is to provide a pressure fluid servo-motor adaptable and capable of imparting shifting movement in either full or partial degree.

A still further object is to provide a pressure fluid servo-motor having an adjustable neutral position or positive stop, at a selective point or position intermediate its path of travel, which neutral position is especially desirable in the shifting of double-acting or twin clutches, and the like.

A still further object is to provide a pressure fluid servo-motor embodying a novel multi-switch control for actuating the same.

A still further object is to provide a pressure fluid servo-motor embodying novel cam actuated adjustable limit switches operable in timed sequence during shifting movements of the same, whereby partial shifting movements of positive duration are obtained.

A still further object is to provide a pressure fluid servo-motor having operating controls which are readily accessible for adjustment and/or replacement.

Still further objects are to provide either a two-way or three-way pressure fluid servo-motor, which is a complete self-contained compact unit; which is flexible and smooth in operation; and which has a positive controlled action.

The above, and additional objects which will hereinafter be more specifically treated are attained by such means as are shown in the accompanying drawings, described in the following specification and then more clearly pointed out in the claims which are appended hereto and form part of the specification.

With reference to the drawings, in which there are illustrated several embodiments of the invention, and throughout the several views of which like characters of reference designate similar parts.

In the present disclosure, I have elected to show and describe the two-way and three-way pressure fluid servo-motors of the instant invention, as operatively connected to engine clutches. However, it is to be understood that this is for purposes of illustration only.

In Figures 1 to 13, inclusive, the numeral 30 designates the power take-off end of a power unit, such as an internal combustion engine, said unit being equipped with a single-acting or non-reversing clutch 31 having a clutch shifting or control lever 32, to which is operatively and pivotally connected, at a point intermediate its length, as by a pivot pin 33, the two-way pressure fluid servo-motor 34 of the present invention.

The two-way pressure fluid servo-motor 34, in the present instance, is preferably mounted upon the upper end of a pedestal or other suitable support 35, with the trunnion brackets 36 of the shifting apparatus disposed upon said upper end in opposed and aligned spaced relation and fixedly secured thereto by studs or bolts 37.

The numeral 38 designates the pneumatic power cylinder of the shifting apparatus, provided with an integrally closed end and an open end, which latter is normally closed by a bossed end cover or head 39 fixedly secured to the cylinder end by cap screws 40. Integrally formed upon, or otherwise fixedly secured to, opposite sides of the cylinder 38, at a point intermediate the length of the same, are axially aligned trunnions 41, whereby the cylinder 38 is journalled or mounted for oscillative movement in the trunnion brackets 36 to compensate for the arcuate path of travel of the pivot pin 33, as will be readily apparent and understood by referring to Fig. 1, and as will hereinafter be more fully described. Exteriorly formed upon the upper wall portion of the cylinder 38, substantially midway the length thereof, and extending upwardly therefrom in a radial relation thereto, is an integral rectangular boss or extension 42 terminating at its upper end in a rectangular flange 43. Similarly formed upon said upper wall portion and extending from the ends of the rectangular boss 42 to the ends of the cylinder 38 are centrally and longitudinally disposed integral ribs 44, which are substantially semi-circular in cross-section, see Fig. 5, and formed within said ribs are pressure fluid passageways 45 communicating at their outer downwardly curved ends with their correlated ends of the cylinder 38 and at their inner upwardly curved ends with vertically disposed pressure fluid ports 46 formed within the rectangular boss 42 in spaced parallel relation, said ports 46 at their upper ends having their side portions outwardly flared, as at 47, for a purpose hereinafter made more apparent.

Disposed for reciprocation within the cylinder 38 is a piston 48 adapted to be fixedly secured to or mounted upon the inner shoulder terminal portion of a piston rod 49, which latter extends outwardly through and is guided by the bossed end cover 39 of the cylinder 38, said piston rod at its outer end having a bifurcated member or yoke 50 threadedly secured thereto and adapted to straddle the clutch control lever 32 and to be pivotally connected thereto by the pivot pin 33. While the piston 48 may be of any desired construction, I prefer to employ the well-known flexible cup type of piston generally employed in pressure fluid cylinders, said piston, in the present instance, consisting of oppositely disposed cups 51, fabricated from leather, or other suitable material, which cups are maintained in back to back spaced relation by a spacer washer 52 and bossed washers 53 and 54, the last mentioned bossed washer 54 being threadedly engaged on the terminal threaded portion of the piston rod 49 and being positively secured in such threaded engagement, as by a headless set screw 55. To effectually prevent leakage of pressure fluid between the bossed end cover 39 and the piston rod 49, I provide said cover with a ring seal 56, substantially in the manner shown in Fig. 4.

The numeral 57 generally designates a solenoid or electromagnetically actuated piston valve for controlling the flow of pressure fluid to the power cylinder 38 and the exhaust of the same therefrom, said piston valve having a cylindrical valve body 58 exteriorly provided upon its lower or bottom cylindrical wall and substantially midway the length thereof with a rectangular flange 59 adapted to seat in sealed relation upon the corresponding rectangular flange 43 of said power cylinder, and to be fixedly secured thereto by cap screws 60. Formed within the valve body 58 is a cylindrical bore 61 and extending coaxially from the ends of said bore to the correlated ends of said valve body are counterbores 62. The numeral 63 designates transversely disposed rows of apertures formed in longitudinal spaced relation within the rectangular flange portion 59 of the valve body 58 adjacent each end of the bore 61 for establishing communication between said bore 61 and the pressure fluid ports 46 of the rectangular boss 42, which apertures are preferably of relatively small diameter, in order to prevent or minimize cutting of or undue wear upon the valve piston cups, presently to be described, and also to restrict or slow the flow of pressure fluid to the cylinder 38 and the exhaust of the same therefrom, the latter to provide a cushioning action for the servo-motor during each cycle of operation of the same. Formed within the upper cylindrical wall of the valve body 58 midway the length of the bore 61 is a pressure fluid inlet or supply port 64, and also formed in the lower cylindrical wall of the valve body 58 and leading from each of the counterbores 62 are pressure fluid exhaust ports 65.

Figure 4:
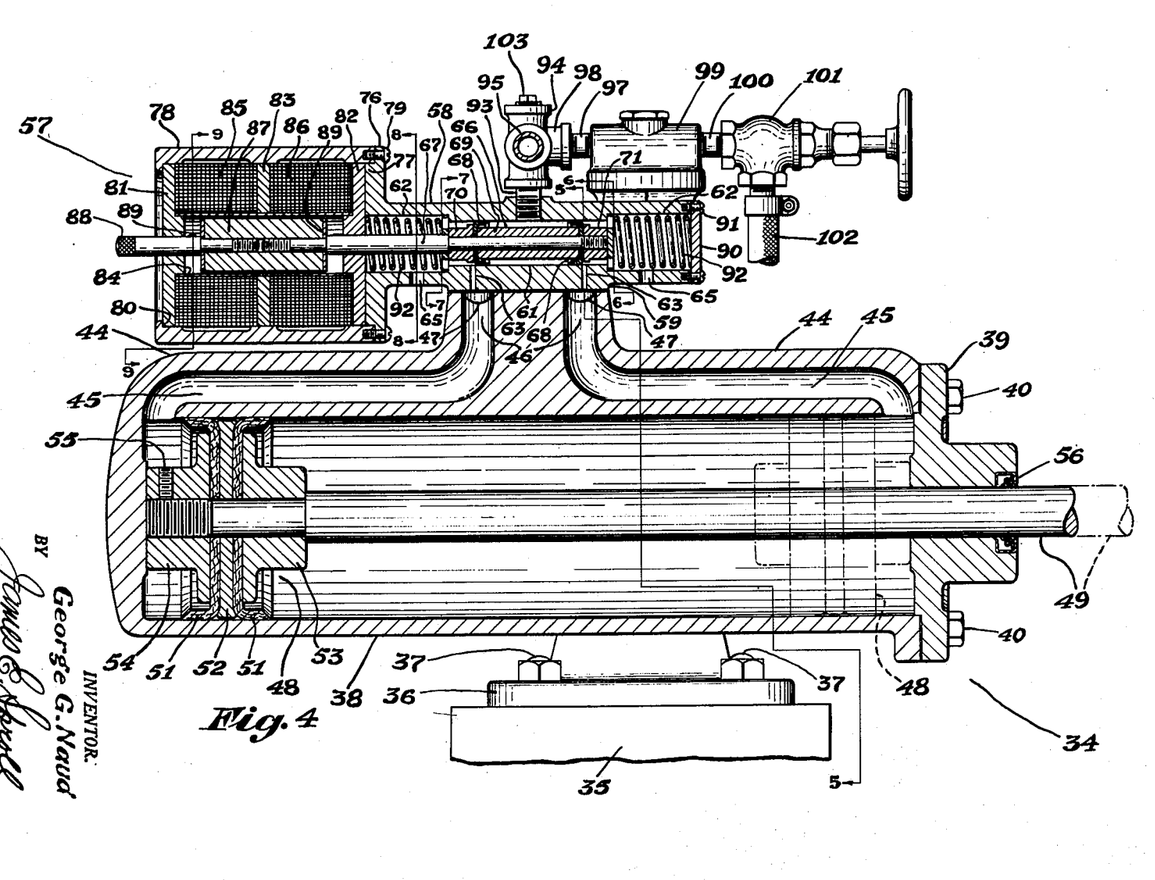
Figure 4 is a vertical longitudinal section taken on the line 4—4 of Fig. 3.
Figures 5, 6, 7, 8, 9:
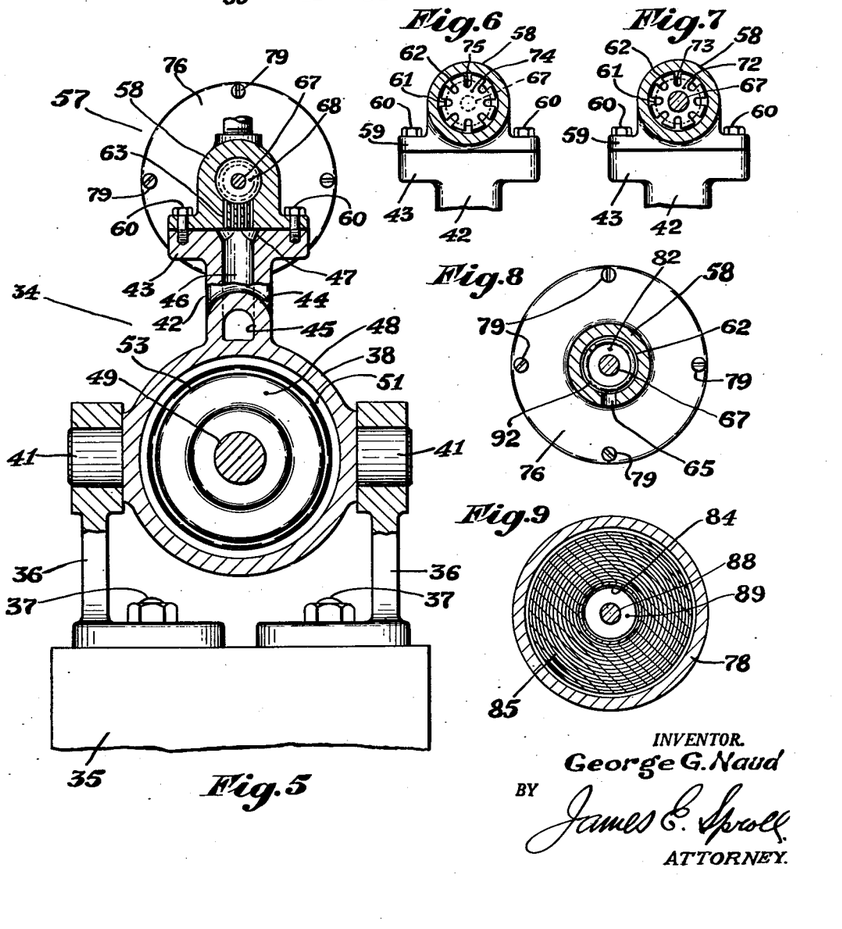
Figures 5, 6, 7, 8 and 9 are vertical transverse sections taken, respectively, on the lines 5—5, 6—6, 7—7, 8—8, and 9—9 of Fig. 4.

Reciprocable within the bore 61 is a pressure balanced, flexible cup type piston 66 adapted to be mounted upon and fixedly secured to the inner shouldered terminal portion of a piston rod or stem 67, said piston consisting of oppositely disposed flexible cups 68, fabricated from any suitable material, which cups are maintained in fixed longitudinal spaced relation upon said shouldered terminal portion by an intermediate spacer sleeve 69 and bossed end washers 70 and 71, said last mentioned washer 71 being threadedly engaged upon the threaded terminal of the piston rod 67, as shown in Fig. 4. The flexible cups 68 are positionally spaced or located upon the piston rod 67 in such a manner that when the piston 66 is in its neutral or normally inactive midposition, as shown in Fig. 4, said cups 68 are positioned contiguous to their correlated transverse row of apertures 63, but are intermediate the latter and the pressure fluid inlet port 64, thus cutting off communication with the same, while establishing communication between said apertures 63 and the pressure fluid exhaust ports 65.

Figure 10:
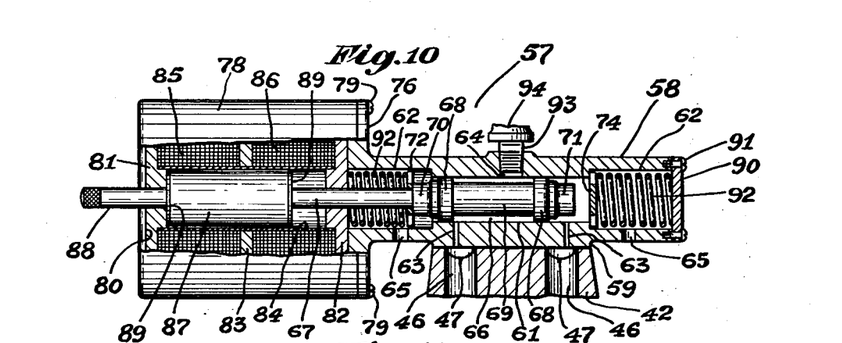
Figure 10 is a vertical longitudinal medial section, partially in side elevation, of the solenoid actuated piston control valve of the servo-motor, with the solenoid armature and valve piston shown in position for effecting clutch engagement.
Figure 11:
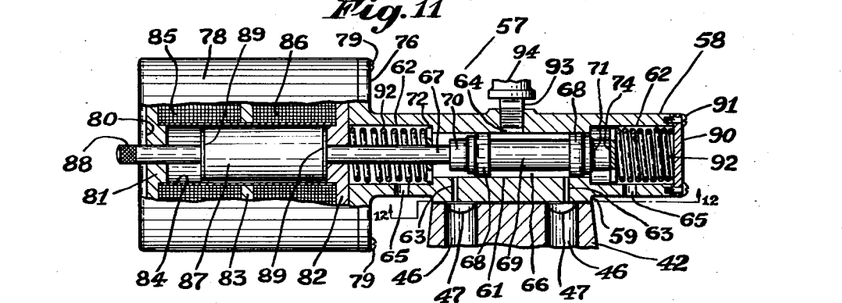
Figure 11 is a similar view of the solenoid actuated piston control valve, with the solenoid armature and valve piston shown in position for effecting clutch disengagement.
Figure 12:
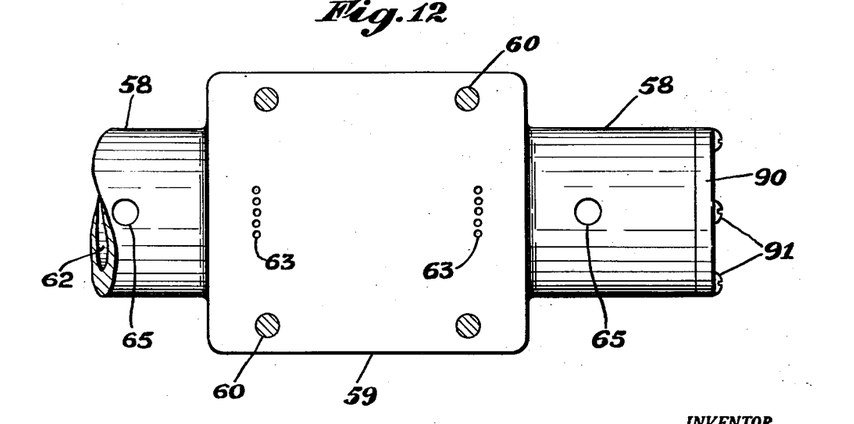
Figure 12 is an inverted fragmentary horizontal section taken on the line 12—12 of Fig. 11.

Normally seating upon the inner shoulder end of its correlated counterbore 62 and abutting the bossed end disk 70 and also slidably mounted upon the piston rod or stem 67 is a centrally perforated disk or spring seat 72 having a series of notches or open-ended slots 73 cut in the peripheral edge portion thereof, and similarly seating within the other counterbore 62 and abutting the bossed end disk 71 and also axially slidable within said counterbore is a disk or spring seat 74 also having peripheral notches or slots 75, said disks 72 and 74 being notched as herein shown and described, in order to provide and maintain communication, at all times, between the bore 61 and the counterbores 62, and thereby positively insure of complete exhaustion of pressure fluid between the ports 46 and the exhaust ports 65, following each movement of the power piston 48, as will be manifest and apparent by referring to Figs. 4, 10 and 11.

Integrally formed upon one end of the valve body 58 is a solenoid supporting flange 76 having a centering boss 77 formed upon its face adapted to receive in concentric seated relation thereon the inner end of a cylindrical solenoid casing 78, which latter is fixedly secured to the flange 76 by machine screws 79 and extends outwardly therefrom in axial prolongation thereto, said solenoid casing 78 at its open outer end having an annular shoulder 80 for a purpose now to be described. Snugly fitting within the solenoid casing 78 are inwardly bossed and centrally apertured end pole pieces 81 and 82, respectively, and an annular center pole piece 83, said end pole piece 81 being adapted to abut or seat upon the annular shoulder 80, while the end pole piece 82 is adapted to abut the face of the solenoid supporting flange 76. The numeral 84 designates a concentrically disposed tubular armature guide, the ends of which receive and snugly fit upon the inwardly bossed portions of the end pole pieces 81 and 82, and upon which, midway its length, the center pole piece 83 is mounted. Wound upon the armature guide 84, intermediate the end pole pieces 81 and 82 and center pole piece 83 are solenoid coils 85 and 86, the peripheral surfaces of which also snugly fit within the solenoid casing 78.

Reciprocatively disposed within the tubular guide 84 is an armature 87, one end of which is adapted to receive and threadedly engage the outer shouldered terminal portion of the piston rod or stem 67, which latter extends through the end pole piece 82 to effect such connection, while the opposite end of the armature 87 is adapted to receive and threadedly engage the inner shouldered terminal portion of a knurled stem 88, which extends through the end pole piece 81 for effecting manual operation of the piston valve 66, when and as desired. To substantially minimize or eliminate magnetic adhesion between the end pole pieces 81 and 82 and the ends of the armature 87, when the latter is at either end of its travel, said armature is provided upon its ends with centrally perforated disks 89 of non-ferrous or non-magnetic material, which are positively retained in abutment with the ends of the armature 87 by the shoulders of the piston rod 67 and the knurled stem 88, as shown in Fig. 4.

By referring to Figs. 4, 10 and 11, it will be noted and observed that the pole piece 82, in addition, also functions as a closure for the counterbore 62 adjacent thereto, while the counterbore 62 at the opposite end of the valve body is adapted to be normally closed by a disk-shaped cover 90, which is fixedly secured to the end of the valve body by machine screws 91. Concentrically disposed within the counterbores 62 for interposition between the disk 72 and the end pole piece 82 and between the disk 74 and the cover 90 are helical compression springs 92 for balancing the piston 66 and returning the same to its neutral position when the solenoid coils 85 and 86 have been de-energized.

Connected to the pressure fluid inlet or supply port 64 by a pipe nipple 93 is a cross or four-way fitting 94, to one side of which is connected, by a pipe elbow 95, a pressure gauge 96, and connected to the opposite side of said fitting 94, by pipe nipples 97 and a pipe elbow 98 is a pressure fluid reducing and regulating valve 99, to the inlet end of which is connected, by a pipe nipple 100, a pressure fluid volume regulating angle valve 101, which latter valve is connected by a hose 102 to a source of pressure fluid, not shown. The upper branch of the four-way fitting 94 is normally closed by a pipe plug 103, which may be removed at suitable intervals to effect lubrication of the moving parts of the servo-motor.

To obtain the desired operating condition for the servo-motor, the reducing valve 88 is adjusted and set for the required pressure and the volume valve 101 is also adjusted and set for the required speed of operation, and insofar as the last mentioned valve is concerned, it should be here carefully noted, that the volume regulating angle valve 101 is not primarily a shut-off valve, inasmuch as another or second valve, not shown, is provided in the pressure fluid supply line 102 for shut-off purposes, hence, the valve 101, of necessity, after adjustment for the desired speed of operation should be left undisturbed, unless it is found necesary to increase or decrease the speed of operation, for any reason, at which time the volume valve 101 is re-adjusted and re-set to the new or selected speed of operation. In the present disclosure, the volume angle valve 101 is shown and described as being connected to the inlet or high pressure side of the pressure reducing valve 99; however, it has been found desirable and expedient in many installations to transpose said volume angle valve 101 to the outlet or low pressure side of said pressure reducing valve 99; consequently, no restriction as to specific location of these valves 99 and 101 in relation to each other is contemplated by the present invention, the instant showing being merely illustrative.

Figure 13:
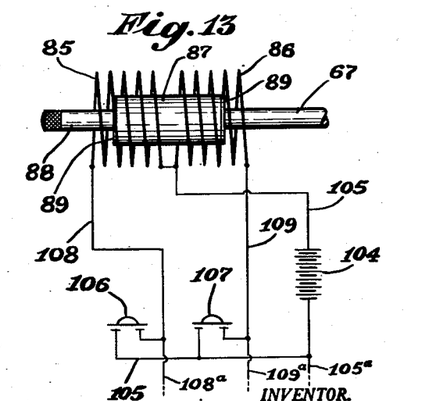
Figure 13 is a diagrammatic view of the electrical circuits of the two-way pressure fluid servo-motor.

In the electrical diagram illustrated in Fig. 13, the numeral 104 designates a battery or other suitable source of electrical current or energy, while the numeral 105 designates the circuit of said battery, one end or terminal of which is connected to the bridged inner terminals of the solenoid coils 85 and 86, as shown, the other or opposite end of said battery circuit 105 being branched, as indicated, and the individual branches of same being each connected to corresponding poles or points of push button, two-point make, switches 106 and 107, respectively. To complete the circuits of the push button switches 106 and 107, a lead 108 connects the opposite pole or point of the switch 106 with the outer terminal of the solenoid coil 85, while a lead 109 connects the opposite pole or point of the switch 107 with the outer terminal of the solenoid coil 86.

In the two-way electrical control, above described, the push button switch 106 functions as the clutch engaging switch, while the push button switch 107 functions as the clutch disengaging switch. The push button switches 106 and 107 form and constitute a clutch control station, which may be located in close proximity to the pressure fluid servo-motor 34, or remotely therefrom, as desired and found expedient. However, should an additional remote clutch control station or stations be desired or required, the battery circuit 105 may be extended, as indicated at 105a, and the push button circuits 108 and 109 similarly extended, as indicated at 108a and 109a, respectively, to such station or stations, not shown.

Figure 3:
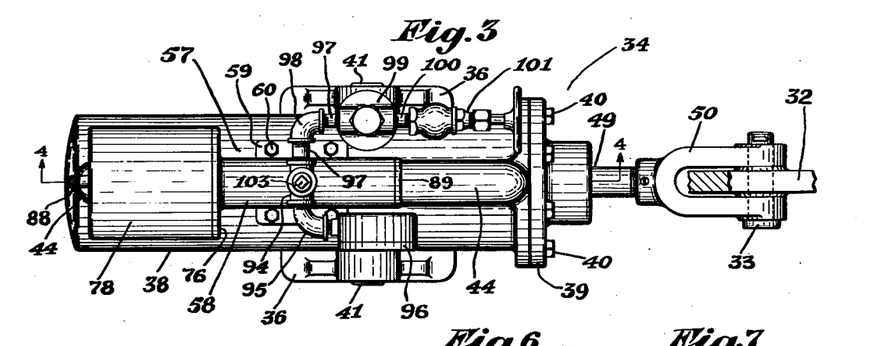
Figure 3 is a top plan view of the same taken at the line 3—3 of Fig. 1.

In the operation of the two-way pressure fluid servo-motor 34, assuming the pressure reducing and regulating valve 99 and the volume or shut-off valve 101 to be set and adjusted for the desired operating condition, and also assuming the servo-motor 34 to be in the clutch disengaged position shown in Figs. 1, 3 and 4 of the drawings, and the solenoid piston valve 57 to be in its normally neutral position shown in Fig. 4, the operation is as follows: To effect engagement of the clutch 31, the operator closes or depresses the push button switch 106 to energize the solenoid coil 85 and thereby pull or axially move the armature 87 and its correlated piston valve 66 to the position shown in Fig. 10, whereupon pressure fluid is admitted to the left hand end of the power cylinder 38, through the related apertures 63, port 46 and passageways 45, thus causing the piston 48 to move from its position shown in full lines to the position shown in dot and dash lines in Fig. 4, and in consequence causing the clutch or control lever 32 to move from the full line position to the dot and dash line position shown in Fig. 1 for effecting engagement of the clutch 31, and concurrently therewith exhausting the air in the right hand end of the power cylinder 38, displaced by the piston 48, through the related passageway 45, port 46, apertures 63 and exhaust port 65. Upon completion of engagement of the clutch 31, the operator releases the push button switch 106, thereby de-energizing the solenoid coil 85, at which time, the compressed piston balancing spring 92, at the solenoid end of the valve, returns the piston valve 66 to its normally neutral position shown in Fig. 4, thus again opening both ends of the power cylinder 38 to the exhaust ports 65 and permitting exhaust of the pressure fluid in the left hand end of said cylinder through its related exhaust port 65, as will be apparent and manifest by referring to Fig. 4.

Figure 1:
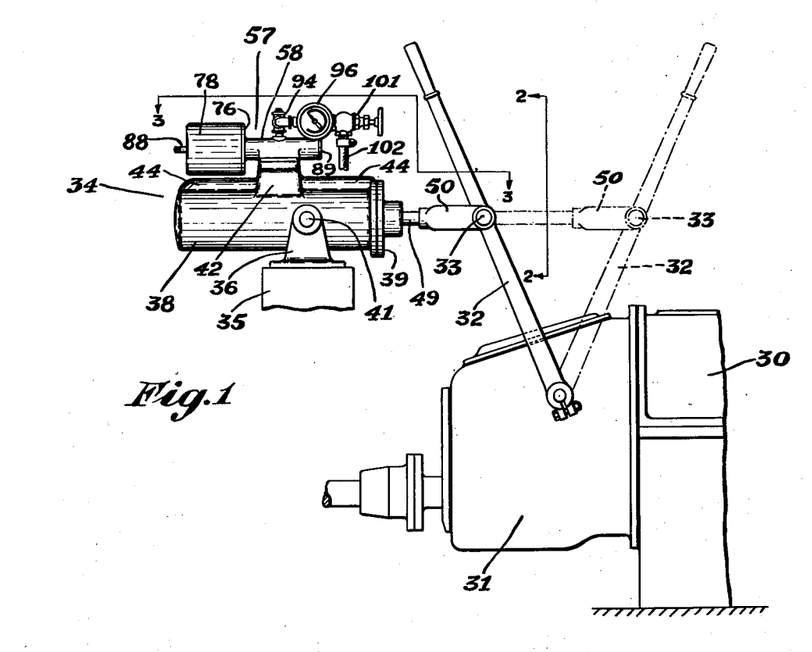
Figure 1 is a side elevation of the two-way pressure fluid servo-motor, comprehended by the present invention, which is shown in its retracted position, and as it would appear when operatively connected to the shifting lever of a single-acting clutch schematically illustrated therein.
Figure 2:
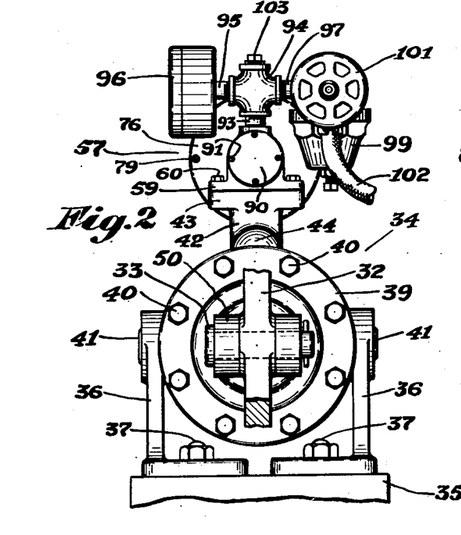
Figure 2 is an end elevation of the two-way pressure fluid servo-motor, taken at the line 2—2 of Fig. 1.

To effect disengagement of the clutch 31, the operator closes or depresses the push button switch 107 to energize the solenoid coil 86 and thus pull or axially move the armature 87 and its correlated piston valve 66 to the position shown in Fig. 11, thereby admitting pressure fluid to the right hand end of the power cylinder 38 and causing the piston 48 to return to its full line position shown in Fig. 4 and the clutch or control lever to the full line position shown in Fig. 1, thus disengaging the clutch 31 and at the same time exhausting the air in the left hand end of the power cylinder to the atmosphere through its related exhaust port 65. Upon disengagement of the clutch 31, the operator releases the push button switch 107, thus deenergizing the solenoid coil 86 and thereby permitting the compressed piston balancing spring 92, at the outer or right hand end of the valve 57, to return the piston valve 66 to its normal neutral position shown in Fig. 4 and in consequence again opening both ends of the power cylinder to their respective exhaust ports 65, whereat the pressure fluid in the right hand end of the said cylinder is instantaneously exhausted to the atmosphere.

Referring now to the three-way type of pressure fluid servo-motor shown in Figs. 14 to 21, inclusive, the numeral 130 designates the power take-off end of an internal combustion engine, or the like, equipped with a double-acting or reversing clutch 131 having a clutch shifting or control lever 132, to which is operatively and pivotally connected, at a point intermediate its length, as by a pivot pin 133, the three-way type of electro-pneumatic shifting apparatus 134 of the present invention.

The numeral 135 designates a pedestal or support, upon the upper end of which, the trunnion brackets 136 of the servo-motor 134 are mounted in opposed and aligned spaced relation, and are fixedly secured thereto by studs or bolts 137. Mounted for oscillative movement in the trunnion brackets 136 is a pneumatic power cylinder 138 having a bossed end cover 193 fixedly secured to its open end by cap screws 140, said cylinder also having axially aligned trunnions 141 integrally formed upon opposite sides thereof for mounting the same in said trunnion brackets 136, to compensate for the arcuate path of travel of the pivot pin 133, as will be obvious by referring to Fig. 14.

Exteriorly formed upon the top center portion of the cylinder 138, substantially midway its length, and extending vertically therefrom is an integral rectangular boss 142 terminating at its upper end in a rectangular flange 143. Similarly formed upon said top center portion and extending from each end of said rectangular boss 142 to each end of the cylinder 138 are longitudinally disposed semi-circular hollow ribs 144.

It should be understood here that the cylinder 138 is provided with pressure fluid passageways 145 and the rectangular boss 142 with pressure fluid ports 146 with flared upper ends 147, in the same manner and for the same purpose, as hereinbefore described for the cylinder 38 and rectangular boss 42. It should also be here understood, that the cylinder 138 is provided with a piston of the same type as previously described herein for the cylinder 38, the piston rod 149 of which extends outwardly through and is guided by the bossed end cover 139 and at its outer end is provided with a bifurcated member or yoke 150 threadedly secured thereto and adapted to straddle the clutch or control lever 132 and to be pivotally connected thereto by the pivot pin 133.

The three-way type of pressure fluid servo-motor 134 is equipped with substantially the same type of solenoid or magnetically actuated piston valve 57 hereinbefore described for the servo-motor 34, hence like numerals designate like parts in Figs. 14 to 21, inclusive, the slight differentiation between the solenoid piston valve 57 of the servo-motor 34 and the servo-motor 134 being in the electrical controls for same, which will hereinafter be more fully described. The piston valve 57, in the three-way type of servo-motor, is fixedly secured by the cap screws 60 to its rectangular flange 143, in the same manner as herein shown and described for the two-way type.

Integrally formed upon the side of the cylinder 138 and the rectangular boss 142 is a pad 210, and similarly formed upon the underside of the rectangular flange 143 is a pad 211 having its outer face in alignment with the outer face of the pad 210, and fixedly secured to said pads, as by cap screws 212, is one end of a longitudinally disposed plate bracket 213, said bracket for the reason of compactness being so positioned as to be co-extensive with the inner half of the length of the power cylinder 138, as shown in the several views of the drawings. Integrally formed upon the outer face or side of the bracket 213, in aligned spaced relation, are laterally extending perforated ears or lugs 214, and slidably mounted within said ears is a longitudinally disposed reciprocative cam rod 215 having a depressed or low portion 216 extending lengthwise of the same intermediate its length and terminating in inclined or cam portions 217, the function of which will presently be made apparent. The cam rod 215 is adapted to receive reciprocative movement from the piston rod 149, and for this purpose the common or corresponding ends of said cam and piston rods are adjustably interconnected by an arm or link 218, which is adjustably secured to the piston rod 149 by a hollow head set screw 219, and similarly secured to the cam rod by a hollow head set screw 220, for a reason hereinafter more fully set forth.

Figures 14, 18:
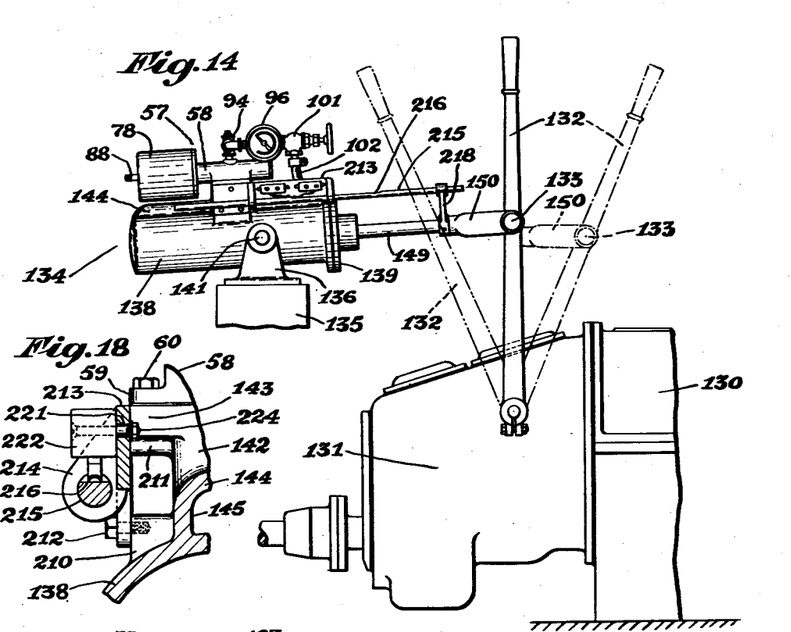
Figure 14 is a side elevation of the three-way pressure fluid servo-motor comprehended by the present invention, which is shown in its neutral position, and as it would appear when operatively connected to the shifting lever of a double-acting clutch schematically illustrated therein.
Figure 18 is an enlarged fragmentary vertical transverse section taken on the line 18—18 of Fig. 16.
Figure 15:
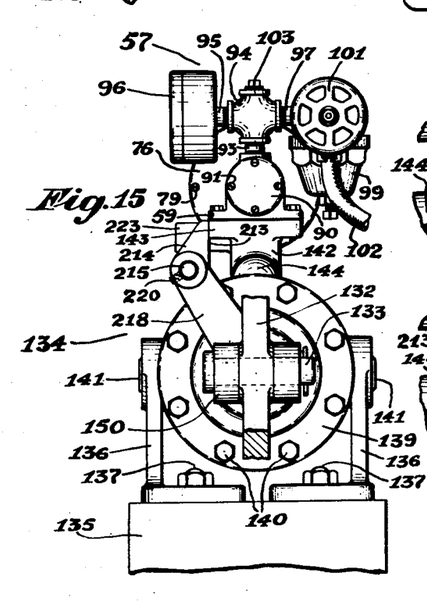
Figure 15 is an end elevation of the three-way pressure fluid servo-motor taken at the line 15—15 of Fig. 16.
Figures 16, 17, 21:
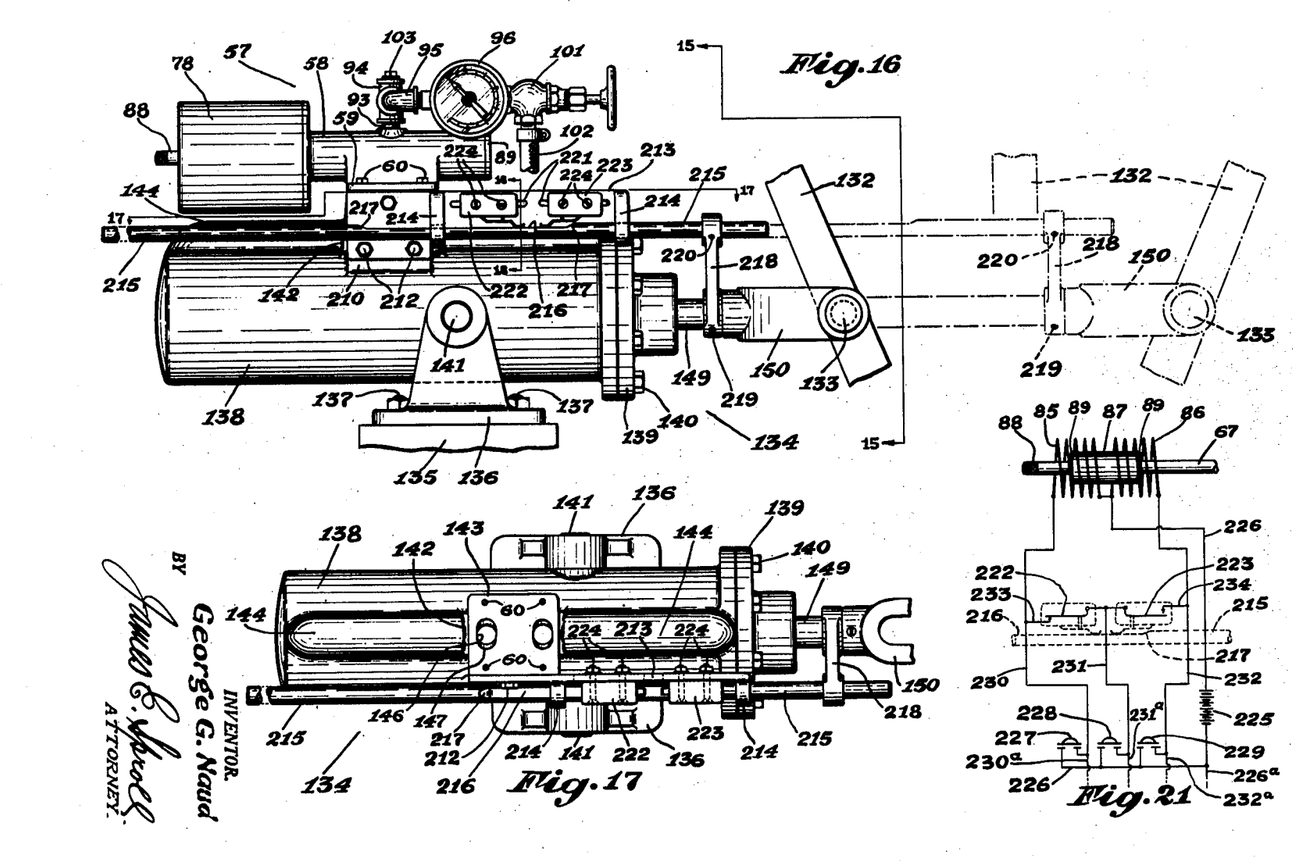
Figure 16 is an enlarged view in side elevation of the three-way servo-motor, as it would appear in its fully retracted or reverse clutch engaging position.
Figure 17 is a horizontal section taken on the line 17—17 of Fig. 16.
Figure 21 is a diagrammatic view of the electrical circuits of the three-way pressure fluid servo-motor, with the adjustable cam rod and adjustable limit switches of same shown in dotted lines in a reverse clutch engaging position.

Formed in endwise spaced relation, within that portion of the plate bracket 213 intermediate the ears 214, are longitudinally disposed slots 221, and mounted in endwise spaced relation, for longitudinal adjustment upon the outer face of said slotted portion, are cam actuated, single pole, single throw, limit switches 222 and 223, respectively, which switches are secured or clamped in adjusted spaced relation upon the bracket 213 by clamping bolts 224, the inner end portions of which extend through the slots 221 for this purpose, as shown more clearly in Figs. 17 and 18.

In the electrical diagram for the three-way type of servo-motor 134, the numeral 225 designates a battery, or other source of electric current, and 226 denotes the circuit of same, one end or terminal of which is connected to the bridged inner terminals of the solenoid coils 85 and 86, while the triple branches at the opposite end of said circuit 226 are connected to corresponding poles or points of push button, two-point make, switches 227, 228 and 229, respectively. In order to complete the circuits of these push button switches, the opposite pole or point of the switch 227 is connected by a lead 230 to the outer terminal of the solenoid coil 85; the opposite pole or point of the switch 228 is jointly connected by a lead 231 to common terminals of the limit switches 222 and 223; and the opposite pole or point of the switch 229 is connected by a lead 232 to the outer terminal of the solenoid coil 86. The circuit of the limit switch 222 is completed by a bridge lead 233, which connects the make and break terminal of said limit switch with the solenoid coil lead 230, while the circuit of the limit switch 223 is completed by a bridge lead 234, which connects the make and break terminal of said limit switch with the solenoid coil lead 232.

In the above described three-way electrical control, the push button switch 227 functions as the clutch engagement switch for effecting forward movement of the correlated driven unit; the push button switch 228 functions as the clutch disengaging or neutralizing switch; and the push button switch 229 functions as the clutch engagement switch for effecting reverse movement of the correlated driven unit. The three push button switches 227, 228 and 229 form and constitute a clutch control station, which may be located in close proximity to the three-way pressure fluid servo-motor 134, or remotely therefrom, as found necessary and expedient. In the event an additional remote clutch control station or stations be required, the battery circuit 226 is extended, as indicated at 226a, and the push button circuits 230, 231 and 232 are similarly extended, as indicated at 230a, 231a and 232a, to such control station or stations, not shown.

The primary function and purpose, in the three-way pressure fluid servo-motor 134, of the adjustable cam rod 215 and the adjustable limit switches 222 and 223 operated thereby, is to provide an adjustable neutral position or positive stop for said servo-motor, inasmuch as axial or longitudinal adjustment of the cam rod 215, in its correlated adjustable arm 218, will vary the location of the neutral position or positive stop of the servo-motor in relation to the total stroke of the same, as will be readily apparent by referring to the drawings. In connection with the foregoing, another important feature and function of the adjustable limit switches 222 and 223 carried by the bracket 213, is that such switches are longitudinally adjusted and set relative to each other to conform with any selected operational speed of the servo-motor 134, as for example, for relatively low operational speeds the limit switches are in comparatively close relation, while, for relatively higher operational speed, the limit switches are spaced further apart, to thus overcome any tendency of the servo-motor to overtravel its selected neutral position in either direction.

In the present application of the servo-motor 134 to the clutch 131, the aforementioned neutral position or positive stop of said servo-motor represents the disengaged position of said clutch, it being here noted in this connection, that when the servo-motor 134 is in the neutral position aforesaid, the circuits of the limit switches 222 and 223 are open and, in consequence, the push button switch 228 is inoperative. However, it should also be noted at this point that the circuits of the push button switches 227 and 229 are entirely independent of the limit switch circuits, and, hence, are operative at all times upon depression or closure of said button switches, regardless of whether the servo-motor 134 is in either terminal position or in its intermediate neutral position. In other words, the servo-motor may be moved from its neutral position to its forward clutch engaged position, or to its reverse clutch engaged position, or from the latter to the forward position, or vice-versa, by merely depressing or closing the appropriate push button switch 227 or 229. As above stated, when the servo-motor 134 is in its neutral position, both the limit switches 222 and 223 are open, inasmuch as the resilient finger of the switch 222 is resting upon the higher level of the cam rod 215 and the resilient finger of the switch 223 is resting upon the lower level or portion 216 of said cam rod, see Figs. 14 and 19. However, when the servo-motor 134 is in a forward clutch engaged position, the limit switch 222 is open and the limit switch 223 is closed, for the reason that the resilient fingers of both such switches are resting upon the higher level of the cam rod 215, see Fig. 20. On the other hand, when the servo-motor 134 is in a reverse clutch engaged position, the limit switch 222 is closed and the limit switch 223 is open, since the resilient fingers of both these switches are resting upon the lower level or portion 216 of the cam rod 215, see Figs. 16, 17 and 21.

For a proper and readier understanding of the construction of the limit switches 222 and 223, it should be here stated, that, the limit switch 222 is normally closed when its resilient finger is down and the limit switch 223 is similarly closed when its resilient finger is up. In both of these switches the spring tension on their respective fingers is down, so that the latter will be positively actuated by the high point of the cam, thus it will be apparent and obvious from the foregoing that the limit switch 222 is opened when its finger rides up on the cam and the limit switch 223 is closed when its finger rides up on the cam, in other words, the action of these limit switches are opposite to each other when their fingers move up and down.

Figure 19:
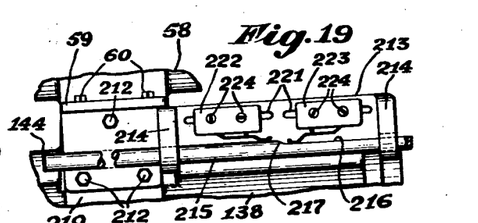
Figure 19 is an enlarged fragmentary side elevation of the servo-motor with the adjustable cam rod and adjustable limit switches of same illustrated in their neutral or clutch disengaged position.
Figure 20:
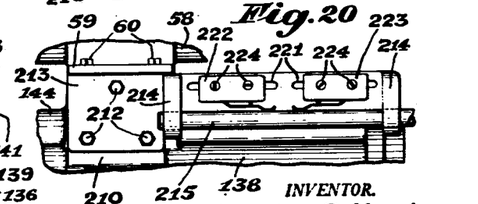
Fig. 20 is a similar view with the adjustable cam rod and adjustable limit switches of the servo-motor illustrated in their forward clutch engaged position.

The operation of the three-way pressure fluid servo-motor 134 is substantially the same as that hereinbefore described for the two-way pressure fluid servo-motor 34, insofar as full travel or shifting movement of the servo-motor is concerned, the primary and essential difference in the operation being the actuation and functioning of the limit switches 222 and 223 together with their correlated push button switch 228, whereby partial travel or limited movement of the servo-motor is obtained. With the foregoing in view and assuming the servo-motor 134 to be in the neutral position shown in full lines in Fig. 14 and the limit switches 222 and 223 open, as shown in Fig. 19, the operator, if forward movement is desired, closes or depresses the push button switch 227 to energize the solenoid coil 85 and thus effect forward engagement of the clutch 131, as shown by dot and dash lines in Figs. 14 and 16, at which time, see Fig. 20, the limit switch 222 is open and the limit switch 223 is closed; if, however, reverse movement is desired the operator closes or depresses the push button switch 229 to energize the solenoid coil 86 and thus effect reverse engagement of the clutch 131, as shown by double dot and dash lines in Fig. 14 and full lines in Fig. 16, at which time, see Figs. 16, 17 and 21, the limit switch 222 is closed and the limit switch 223 is open. To return to the neutral position from either forward or reverse clutch engaged positions, the operator closes or depresses the push button switch 228, and if movement is from the forward position, the solenoid coil 86 is energized through the closed limit switch 223, but, if movement is from the reverse position the solenoid coil 85 is energized through the closed limit switch 222. Manifestly, by varying the location and number of cam portions on the cam rod 215, and increasing the number of limit and push button switches, shifting movements of varying numbers and lengths may be obtained or provided for the servo-motor 134.

In the accompanying drawings and in the foregoing description, the trunnions 41 and 141, respectively, of the power cylinders 38 and 138 have been shown and described, as located slightly to the right of the mid-lengths of the same, this, for the purpose of more uniformly distributing and balancing the weight of the servo-motors 34 and 134 upon and about their respective correlated trunnions insofar as practicable, and thereby relieve their respective correlated clutch shifting levers 32 or 132 of any unnecessary load.

In the present disclosure, a power cylinder 38 has been shown and described for the two-way servo-motor 34, and another power cylinder 138 for the three-way servo-motor 134; however, in order to minimize or reduce cost of manufacture of each type of unit, it should be here stated that the power cylinder 138 may be used for both the two-way and three-way types of servo-motors.

In the initial adjustment and setting, also, in any readjustment and resetting of the pressure fluid reducing and regulating valve 99 and the volume regulating angle valve 101 of the three-way servo-motor 134, great care should be exercised and observed in effecting the same, principally for the reason that excessive pressure and volume will cause and produce undesirable hunting of the servo-motor in seeking its neutral position.

From the foregoing, it will be apparent and manifest that the servo-motors herein disclosed are comparatively simple in construction and operation, are easy to install, and do not require any special skill or qualification on the part of the operator of the same.

While I have herein shown and described the invention with sufficient detail to enable those skilled in the art to understand the mode of construction and the principles involved, it is to be understood that there is no intentional limitation herein to the specific forms and precise details of construction of the invention shown and described, except as expressly defined by the appended claims, and it is to be further understood that various modifications of such construction may be resorted to without departing from the spirit of the invention, or the benefits derivable therefrom.

What I claim as my invention, and desire to secure by Letters Patent, is:

1. In a pressure fluid servo-motor, the combination of pressure fluid actuated power means having two operating positions and an intermediate adjustable neutral position; valve means for controlling ingress and egress of pressure fluid to and from said power means; and means for actuating said valve means whereby the power means is selectively moved from its neutral position to either of its operating positions or from one of the latter to the other and vice-versa, said valve actuating means including means operable by and adjustable relative to said power means for changing the neutral position of the latter relative to the operating positions of the same, said actuating means also including control units mounted upon said power means for individual adjustment relative to each other so as to co-act with and be operable by said neutral position changing means for effecting stoppage of the power means in any selected neutral position.

2. In a pressure fluid servo-motor, the combination of pressure fluid actuated power means having two operating positions and an intermediate adjustable neutral position; electrically operable and pressure-balanced valve means for controlling ingress and egress of pressure fluid to and from said power means; manually operable switch means for actuating said valve means whereby the power means is selectively moved from its neutral position to either of its operating positions or from one of the latter to the other and vice-versa; power operated switch means for stopping said power means in its adjusted neutral position, said switch means including switches mounted upon said power means for individual adjustment relative thereto and to each other, and means operatively connected to said power means for actuating said switches, said last mentioned means being adjustable relative to the power means for selectively determining and regulating the neutral position of the latter.

3. In a pressure fluid servo-motor, the combination of pressure fluid actuated power means having two operating positions and an intermediate adjustable neutral position; electrically operable and pressure-balanced valve means for controlling ingress and egress of pressure fluid to and from said power means; manually operable switch means for actuating said valve means whereby the power means is moved selectively from its neutral position to either of its operating positions or from one of the latter to the other and vice-versa; power operated limit switches for stopping said power means in its selectively adjusted neutral position, said limit switches being mounted upon said power means for individual adjustment relative thereto and to each other; and a cam member operatively connected to the power means for actuating said limit switches, said cam member being adjustable relative to said power means for selectively determining and regulating the neutral position of the latter.

4. In a pressure fluid servo-motor, the combination of pressure fluid actuated power means having two operating positions and an intermediate adjustable neutral position; electrically operable and pressure balanced valve means for controlling ingress and egress of pressure fluid to and from said power means; manually operable switch means for actuating said valve means whereby the power means is selectively moved from its neutral position to either of its operating positions or from one of the latter to the other and vice-versa; power operated limit switches for stopping said power means in its selected neutral position, said limit switches being adjustable relative to each other for varying the operational speed of the power means; and means adjustably interconnected to and moving synchronously with said power means for actuating said limit switches and for selectively adjusting the neutral position of said power means.

5. The combination with a reversible power transmission mechanism provided with a manually and power operated shift lever having an adjustable neutral position, of a pressure fluid servo-motor comprising a fluid pressure power cylinder; a reciprocating piston therein having a piston rod extending therefrom for operative connection with said shift lever; a pressure and spring-balanced solenoid operated valve communicating with the ends of said power cylinder for controlling ingress and egress of pressure fluid thereto and therefrom; manually operable switch means for activating the solenoid of said valve; power operated switches for stopping said shift lever in any selected neutral position, said switches being mounted upon said power cylinder for individual adjustment relative to the center of the same and to each other; and means operatively connected to the reciprocative piston rod aforesaid for actuating said switches, said means being adjustable relative to said piston rod whereby the neutral position of the shift lever aforesaid may be changed to vary the degree of throw of same upon each side of its selected neutral position.

6. The combination with a reversible power transmission mechanism provided with a manually and power operated shift lever having an adjustable neutral position, of a pressure fluid servo-motor comprising a trunnion mounted oscillative pneumatic power cylinder having its trunnion axes located a point intermediate the length thereof so that the servo-motor as a unit is substantially in balance when said shift lever is in its neutral position; a reciprocable piston in said cylinder having a piston rod extending therefrom for pivotal connection with said shift lever; a pressure and spring-balanced solenoid operated valve communicating with the ends of said power cylinder for controlling ingress and egress of pressure fluid thereto and therefrom; manually operable switch means for activating the solenoid of said valve; power operated limit switches for stopping said shift lever in any selected neutral position, said limit switches being mounted upon said power cylinder for individual adjustment relative to the center of same and to each other; and a limit switch activating cam member operatively connected to the aforesaid reciprocable piston rod for synchronous movement therewith, said cam member being adjustable relative to said piston rod for varying the degree of throw of the shift lever on each side of any selected neutral position of the same.

7. The combination with a reversible power transmission mechanism provided with a manually and power operated shift lever having two operating positions and an adjustable neutral position, of a pressure fluid servo-motor for said shift lever and comprising a fluid pressure power cylinder; a piston reciprocable therein having a piston rod extending therefrom for operative connection with said shift lever; a solenoid valve communicating with the ends of said power cylinder for controlling ingress and egress of pressure fluid thereto and therefrom; manually operable switch means for activating the solenoid of said valve, including individual switches for independently obtaining movements of said shift lever from its neutral position to either operating positions or from one of the latter to the other and vice-versa; independently adjustable power operated limit switches for stopping the shift lever in any selected neutral position and adaptable upon independent adjustment relative to each other to conform with the operational speed of the servo-motor; and a limit switch operating cam rod disposed in spaced parallel and substantially co-extensive relation to said piston rod and adjustable secured thereto at a common end for synchronous movement therewith, said cam rod being adjustable relative to the piston rod for varying the degree of throw of the shift lever on each side of its selected neutral position.

GEORGE G. NAUD.

(References on following page)

REFERENCES CITED

The following references are of record in the file of this patent:

UNITED STATES PATENTS

| Number | Name | Date |
|---|---|---|
| 1,230,150 | Geraghty | June 19, 1917 |
| 1,456,050 | Benbow | May 22, 1923 |
| 2,030,986 | Havill | Feb. 18, 1936 |
| 2,094,153 | Harrington | Sept. 28, 1937 |
| 2,156,118 | Kliesrath | Apr. 25, 1939 |
| 2,194,872 | Baade | Mar. 26, 1940 |
| 2,232,038 | Stone | Feb. 18, 1941 |
| 2,234,019 | Bragg | Mar. 4, 1941 |
| 2,314,444 | Crittenden | Mar. 23, 1943 |
| 2,353,835 | Lane | July 18, 1944 |

FOREIGN PATENTS

| Number | Country | Date |
|---|---|---|
| 515,617 | Great Britain | Dec. 11, 1939 |